United States Patent Office 3,098,866
Patented July 23, 1963

3,098,866

PROCESS FOR DECOLORIZING AND PURIFYING O,O-DIALKYLTHIOPHOSPHORYL CHLORIDES AND THIOPHOSPHATE CONDENSATES FORMED THEREFROM

Ralph D. Divine, Westfield, N.J., assignor to American Cyanamid Company, New York, N.Y., a corporation of Maine No Drawing. Filed Nov. 6, 1961, Ser. No. 150,193
7 Claims. (Cl. 260—461)

The present invention relates to a process for improving the color and purity of O,O-dialkylthiophosphoryl chlorides and thiophosphate condensates formed therefrom and more particularly the present invention relates to the improvement in color and purity of such chlorides and thiophosphate condensates formed therefrom in which the O,O-dialkylthiophosphoryl chloride is prepared by the chlorination of the corresponding dithio acid.

O,O-dialkylthiophosphoryl chlorides of the formula

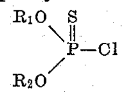

in which $R_1$ and $R_2$ are selected from the group consisting of hydrogen and lower alkyl (such as methyl, ethyl, propyl, butyl and the like) are well known intermediates in the preparation of numerous thiophosphates which are characterized by being useful as pesticides, flotation agents, and as lubricating oil additives, among other uses. These chlorides may be readily prepared by procedures well known to those skilled in the art, as for example that typified and described in U.S. Patent No. 2,482,063.

As noted, these chlorinated compounds are valuable intermediates in the preparation of various thiophosphates suitable for use as pesticides. Thus, for example, the thiophosphates described in U.S. Patent No. 2,520,393 are readily prepared in employing the O,O-dialkylthiophosphoryl chlorides purified in accordance with the present invention. In addition, the compounds described in U.S. Patent Nos. 2,664,437; 2,759,937; 2,759,938 and 2,918,468 all demonstrate the importance of these materials as chemical intermediates.

These compounds, as noted hereinabove, are prepared by the chlorination of the corresponding dithio acid. In general, the equations illustrating the preparation of these compounds are set forth hereinbelow.

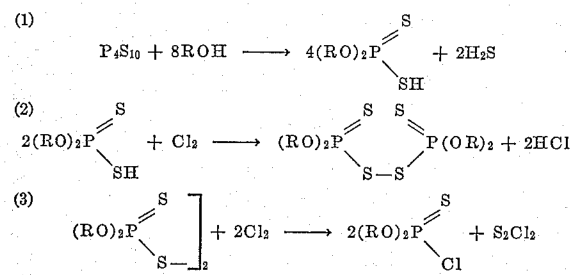

Normally in the purification of the O,O-dialkylthiophosphoryl chloride, sulfur monochloride, a by-product of the reaction, is removed by bisulfite treatment. This reaction may be typified by the following equation:

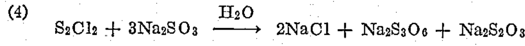

As will be seen from Equation 4, the sulfur monochloride is essentially destroyed, being converted into water-soluble salts which remain in the liquid phase and under normal processing conditions the water-insoluble and non-dispersible chloride is easily separated from the aqueous phase.

It has been my experience that, regardless of the number of times the reaction product composition is washed with bisulfite and additional water washes, that the purity of the product rarely exceeds about 95% and is characterized by a yellowish color. For some purposes, such assay is suitable. In others, these color-forming materials and impurities are most undesirable and in some instances result in the lack of saleability of the product.

The nature of the color-forming impurities is not clearly known. However, they are suspected of being partial conversion products of the dithio acid or products resulting from over-chlorination or combinations and reactions of these two types of materials with others. The fact is the character of the color-forming impurities is not known.

In the event that these color-forming impurities are not removed from intermediate O,O-dialkylthiophosphoryl chloride, they accompany these materials into the thiophosphate condensation products which result from their use, thereby contributing to the discoloration of these final products which under such circumstances are almost black in color. As in the case of the intermediate materials, for some applications it is highly desirable that the product be capable of being sold as a light-colored material in that such is required in various formulations.

In addition to the above facts, the presence of these color-forming impurities in compositions containing a high concentration of the O,O-dialkylthiophosphoryl chlorides actually reduces the yield of some thiophosphate condensation products which result from the use of such intermediates.

Thus, not only does the presence of these color-forming impurities adversely affect the marketability of the intermediate chloride and thiophosphate condensates resulting from the use thereof, but also they have been found to significantly adversely affect yields from the conversion of such chlorides to the corresponding thiophosphates.

While it is possible to remove these color-forming impurities, which can represent up to about 5 to 10% of the bisulfite-washed compositions, by means of distillation, the capital investment required for such equipment is considerable and the distillation is hazardous as these compounds are heat labile. Both of these facts render distillation an unattractive alternate processing route.

Accordingly it is an object of the present invention to provide a process whereby the color-forming impurities normally present in compositions containing O,O-dialkylthiophosphoryl chlorides resulting from the chlorination of the corresponding dithio acids may be readily removed.

A further object of the present invention is to provide a process for the removal of color-forming impurities from compositions containing thiophosphate condensates formed from O,O-dialkylthiophosphoryl chlorides containing such color-forming impurities.

A still further object of the present invention is to provide a means whereby the color-forming impurities referred to in the compositions in the objects hereinabove are removed by simple chemical means as distinguished from procedures requiring costly and specialized distillation equipment.

These and other objects and advantages of the present invention will become more apparent from the detailed description thereof set forth hereinbelow.

In accordance with the present invention a process is provided for improving the color and purity of compositions containing (1) a compound of the formula

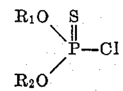

in which $R_1$ and $R_2$ are selected from the group consisting of hydrogen and lower alkyl, which compositions have been prepared by the chlorination of the corresponding dithio acid, and (2) compositions containing the thiophosphate condensates formed therefrom, which compositions have been rendered substantially free of sulfur monochloride, a by-product formed during the chlorination of the corresponding dithio acid. The process comprises treating either the chloride or thiophosphate condensate compositions formed therefrom with an alkali metal (sodium, potassium and lithium) sulfide while employing good agitation and thereafter recovering the product of improved purity and color.

As noted hereinabove, it is an essential aspect of the present invention to remove sulfur monochloride from the reaction composition resulting from the chlorination of the dithio acid. Normally the sulfur monochloride is removed by the treatment of the reaction product composition with an alkali metal bisulfite, preferably sodium bisulfite or sodium sulfite produced by the reaction between caustic and sodium bisulfite. As will be seen in Equation 4 set forth hereinabove, this converts the sulfur monochloride in the presence of water to sodium chloride and various sulfur salts of sodium or other suitable alkali metal depending upon the treating agents employed. These salts are all water soluble and in an aqueous medium are readily separated from the chloride intermediate. The sodium sulfite is normally employed in an amount that will destroy the sulfur monochloride present. This amount can be readily determined by procedures known to those skilled in the art.

For the most part, it is believed to be essential that substantially all of the sulfur present as sulfur monochloride be removed prior to the treatment of the chloride or a thiophosphate condensate thereof with an alkali metal sulfide in accordance with this invention. If a substantial amount (more than about 2 to 3%) of sulfur present as sulfur monochloride is not destroyed, the introduction of the strongly alkaline sulfide could result in the precipitation of gummy sulfurous masses which render subsequent handling of the product extremely difficult. For example, these masses plug lines through which the product is to flow, frequently requiring a shutdown of the operation until they can be removed.

It has been determined that normally these same gummy sulfurous masses will precipitate out at acid pH's also and in particular pH's of below about 6. Accordingly, in order to facilitate processing it is most desirable that the sulfur monochloride be removed.

The alkali metal sulfide and in particular the sodium sulfide, which is believed to react with these color-forming impurities, is normally employed in an excess over that required for such reaction. Being a water-soluble salt, the excess can be readily removed.

The alkali metal sulfide is added to the chloride or the thiophosphate condensate formed from its use at a temperature of from between about 20° and about 60° and preferably at a temperature of from between about 25° and about 45° C. Under 20° C., on the chloride, the treatment with sulfide has been found to be relatively ineffective in that at this temperature the sulfurous compounds would appear to have a tendency to go into the aqueous phase and are not readily reacted. Above 60° C., there tends to be a loss of yield in that the sulfide has the capacity and frequently does, to a small extent, hydrolyze the chloride when the process is carried out on this intermediate. The danger of hydrolysis increases sharply at temperatures above about 45° C. and therefore it is greatly preferred to maintain temperatures of less than 45° C.

The sulfide treatment is carried out for a time sufficient to insure intimate mixing under the temperature conditions employed. Agitation or intermixing of the phases must be carried out to a point to permit reaction of the sulfide with the color-forming impurities and the time required for this is a function of the degree of agitation and temperature employed.

After reacting the color-forming impurities with the sulfide, the reaction mass may be permitted to settle, normally forming two phases. The impurity containing aqueous phase is then separated off to give a purified chloride intermediate or a thiophosphate condensate thereof having vastly improved color and purity.

In this regard, it has been my experience that the purity of the intermediate chloride can be improved from a value of 90 to 95% purity up to a purity of 98% and higher. Colorwise, the intermediate chloride, treated by the process of this invention proceeds from an off-shade yellow to yellowish green coloring to that of water-white. On the APHA scale, this would amount to a change in reading of from 200 to 500 down to values of from about 5 to 10.

With respect to thiophosphate condensates formed from the unpurified intermediate chloride, as for example that product known as parathion, the reaction product of para nitrophenol and a chloride of the class contemplated by this invention, the color improves from a value of 6–8 on the Gardner-Holdt scale to one of from between 2–4. Colorwise, this amounts to a change from a material which is blackish to one that is light tan.

A preferred aspect of this invention is constituted by two distinct steps, particularly with respect to the chloride intermediate, in which the chloride is first washed and treated with an alkali metal sulfite and then subsequently treated with an alkali metal sulfide, as described hereinabove. As noted above, the sulfite treatment is required to remove the sulfur present as sulfur monochloride prior to reaction with the sulfide. This two-step procedure has repeatedly and uniformly resulted in intermediate chloride of high purity which may in general be characterized as being water-white.

While it may be thought that instead of employing this combination of steps that for example two sulfide treatments may be employed, the introduction of the strongly alkaline sodium sulfide into a reaction product containing relatively large amounts of sulfur monochloride would result in the precipitation of gummy sulfurous masses, which render the subsequent handling of the reaction mass extremely difficult. Thus, as noted above, it is important to remove the sulfur monochloride prior to sulfide addition. On the other hand, the employment of two or more bisulfite washes in lieu of the combination referred to hereinabove does not result in the purity of the product being improved significantly above 95% and reaction products so prepared continue to be characterized by a high degree of color.

In order to demonstrate the present invention, the following examples are given primarily by way of illustration. No specific details or enumerations contained therein should be construed as limitations on the present invention except insofar as they appear in the appended claims. All parts and percentages are by weight unless otherwise specifically designated.

*Example 1*

To 200 ml. of a bisulfite washed (and therefore substantially free of sulfur monochloride) O.O-diethylthiophosphoryl chloride having an assay of 94.8% by the piperidine method, were added 200 ml. of a 3% aqueous solution of sodium sulfide at 40° C. The mixture was shaken in a separatory funnel and the mixture was allowed to settle, forming separate layers. The organic layer, i.e., the chloride, was separated and assayed by the piperidine method and found to have a purity of 98.2%.

The bisulfite washed chloride was characterized as an off-shade yellow while the sulfide washed material was characterized as being water-white.

*Example 2*

Two batches of parathion, the condensation product of para nitrophenol and O,O-diethylthiophosphoryl chloride, were prepared. In one batch, a chloride having an assayed purity of 94.8% by the piperidine method was employed in preparing the parathion and in the second the chloride having an assay of 98.2% by the piperidine method was employed. These chlorides were the starting material and the purified material, respectively, referred to in Example 1 hereinabove.

The products obtained employing these chlorides had the following analysis:

| | Control | Sulfide Wash |
|---|---|---|
| Purity, percent | 94.5 | 97.1 |
| Para nitrophenol, percent | <0.01 | <0.01 |
| Color | black | light tan |
| O, O-Diethylthiophosphoryl chloride, percent | 1.12 | 1.48 |

*Example 3*

To 300 cc. of crude O,O-dimethyl chloridothiophosphate carried in toluene (assay 56.2%—piperidine) and prepared through the chlorination of O,O-dimethyldithiophosphoric acid (the by-product sulfur monochloride is hydrolyzed with aqueous sodium bisulfite) is added 200 cc. of a 3% aqueous solution of sodium sulfide at ambient temperature. The combined organic-aqueous system is shaken in a separatory funnel and the layers allowed to separate, with the aqueous layer being drawn off. The assay of the organic layer is now 58.2% and water white. This is condensed with para nitrophenol employing sodium carbonate with cuprous chloride as catalyst. The condensation product thus obtained is conventionally washed with water, the organic layer is filtered and dried over silica gel. It now assays 62.7% as methyl parathion and is light tan in color.

*Example 4*

In two separate preparations of O,O-diethyl O-(2-pyrazinyl)phosphorothioate, O,O-diethyl phosphorochloridothioate was employed. In one of the preparations the chloro compound was treated in accordance with this invention; in the second it was not. In all other respects the process was the same and the amounts of reactants were the same. In the process employing the sulfide treated intermediate, the purity of final product was 93.6; in the other it was 90.3.

*Example 5*

To 400 ml. of crude, condensed parathion (O,O-diethyl O-p-nitrophenylthiophosphate) are added 400 ml. of a 5% aqueous solution of sodium sulfide in a separatory funnel, shaken and the layers allowed to separate. The organic layer is dried by vacuum stripping and is light tan in color. Blanks carried out utilizing water and/or an aqueous solution of sodium carbonate as the wash are much darker in color than the sodium sulfide washed crude.

I claim:

1. A process for improving the color and purity of compositions selected from the group consisting of (1) those containing O,O-di-lower dialkylthiophosphoryl chloride in a high state of purity, said compositions having been prepared by the chlorination of the corresponding dithio acid, and (2) compositions containing the thiophosphate condensates formed therefrom in a high state of purity, which compositions are substantially free of sulfur monochloride but contain color-forming impurities resulting from their process of manufacture, which comprises treating said composition with an alkali metal sulfide at a temperature of from about 20 to about 60° C. and thereafter recovering a product of improved color and purity.

2. A process according to claim 1 in which the treatment with an alkali metal sulfide is carried out at a temperature of from about 25 to about 45° C. with agitation.

3. A process for improving the color and purity of compositions selected from the group consisting of (1) those containing O,O-diethylthiophosphoryl chloride in a high state of purity, said composition having been prepared by the chlorination of the corresponding dithio acid, and (2) compositions containing the thiophosphate condensate formed therefrom in a high state of purity, which compositions are substantially free of sulfur monochloride but contain color-forming impurities resulting from their process of manufacture, which comprises treating said compositions with an alkali metal sulfide at a temperature of from about 20 to about 60° C. and thereafter recovering a product of improved color and purity.

4. A process for improving the color and purity of a composition containing at least 90% of O,O-diethylthiophosphoryl chloride, said composition having been prepared by the chlorination of the corresponding dithio acid, which composition is substantially free of sulfur monochloride but contains color-forming impurities resulting from its process of manufacture, which comprises treating said compositions with an alkali metal sulfide at a temperature of from 20 to about 60° C. and thereafter recovering a product of improved color and purity.

5. A process for improving the color and purity of a composition containing at least 90% of O,O-di-lower alkylthiophosphoryl chloride, which composition is prepared by the chlorination of the corresponding dithio acid, which comprises treating said chlorination product with an alkali metal bisulfite to convert the sulfur as sulfur chloride present to water-soluble sulfur-containing salts, removing said sulfur-containing salts to prepare a composition containing color-forming impurities and treating said composition with an alkali metal sulfide at a temperature of from about 20 to about 60° C. and thereafter recovering a product of improved color and purity.

6. A process according to claim 5 in which the treatment with an alkali metal sulfide is carried out at a temperature of from about 25 to about 45° C. with agitation.

7. A process for improving the color and purity of a composition containing at least 90% of O,O-diethylthiophosphoryl chloride prepared by the chlorination of its corresponding dithio acid which comprises treating said chlorination product with sodium bisulfite to convert the sulfur as sulfur chloride present to water-soluble sulfur-containing salts, removing said sulfur-containing salts to prepare a composition containing color-forming impurities and treating said composition with sodium sulfide while agitating said product and while maintaining the temperature thereof at from about 25 to about 45° C. and thereafter recovering a product of improved color and purity.

References Cited in the file of this patent

UNITED STATES PATENTS

| | | |
|---|---|---|
| 2,692,893 | Hechenbleikner | Oct. 26, 1954 |
| 2,861,040 | Buchanan et al. | Nov. 18, 1955 |